(12) United States Patent
Wu (10) Patent No.: US 7,013,508 B2
(45) Date of Patent: Mar. 21, 2006

(54) BED RAIL ASSEMBLY (76) Inventor: Sung-Tsun Wu, 85-1, No. 249, Chung Ching Road, Pan Chiao City, Taipei Hsien (TW)

( * ) Notice: Subject to any disclaimer, the term of this patent is extended or adjusted under 35 U.S.C. 154(b) by 82 days.

(21) Appl. No.: 10/855,441

(22) Filed: May 28, 2004

(65) Prior Publication Data
US 2005/0262632 A1 Dec. 1, 2005

(51) Int. Cl.
A47C 21/08 (2006.01)

(52) U.S. Cl. .................. 5/426; 5/425; 403/96; 403/97; 403/65; 403/94; 403/263; 403/356; 403/293

(58) Field of Classification Search ............ 5/425–430, 5/658, 659, 662, 496, 498, 424, 503.1, 512, 5/513; 403/96, 97, 94, 65, 112, 113, 109.6, 403/109.1, 116
See application file for complete search history.

(56) References Cited

U.S. PATENT DOCUMENTS

| | | | |
|---|---|---|---|
| 5,671,490 A * | 9/1997 | Wu | 5/426 |
| 6,695,356 B1 * | 2/2004 | Nguyen et al. | 285/321 |
| 2003/0024047 A1 * | 2/2003 | Wu | 5/430 |

* cited by examiner

Primary Examiner—Heather Shackelford
Assistant Examiner—Gilbert Lee
(74) Attorney, Agent, or Firm—Birch, Stewart, Kolasch & Birch, LLP (57) ABSTRACT A bed rail assembly includes a joint device connecting two top tubes, a pair of corner members mounted to free ends of the top tubes, two vertical tubes mounted to and depending from the corner members, and a pair of knuckle devices mounted to lower ends of the vertical tubes. Horizontal support tubes extend from the knuckle devices in a direction substantially normal to a plane defined by the top tubes and the vertical tubes. Extensions project from the knuckle devices to receive and fix support tube thereby forming a rectangular frame onto which a cover is attached to shield the frame. Each knuckle device includes a movable member movably connected to a base of the knuckle device to allow collapse of the bed rail. A Y-shaped belt and an L-shaped retention member are used to secure the bed rail assembly to a mattress.

8 Claims, 8 Drawing Sheets

BED RAIL ASSEMBLY

BACKGROUND OF THE INVENTION

1. Field of the Invention

The present invention relates to a bed rail assembly that can be easily assembled and/or disassembled.

2. The Related Art

A conventional bed, especially a baby bed, generally includes rails on at least one side of the bed to prevent the baby from falling from the bed. A bed rail assembly that is currently available in the market is usually foldable for easy transportation and storage for it occupies a small amount of space after folded. Nevertheless, the conventional rail assembly has a great number of parts forming a complicated mechanism. It is not easy for the general consumers to assemble/disassemble the bed rail.

Thus the present invention is aimed to provide a bed rail assembly that can be easily assembled/disassembled. Further, the bed rail assembly of the present invention comprises a cover to shield moving parts thereof, which prevents a user from being damaged by the movement of the moving parts.

SUMMARY OF THE INVENTION

The present invention relates to a bed rail assembly that comprises a joint device arranged between and pivoted to two top tubes. Each top tube has a flat free end connected to a corner member. Each corner member has a clamp end pivoted to the flat end of the top tube and a receiving end to which a vertical tube is releasably connected by a first leaf spring. A knuckle device has a vertical section rotatably connected to each vertical tube and a horizontal section to which a horizontal support tube is connected. First and second extensions project from the knuckle devices toward each other. A sleeve is slidably and removably fit over the first extension. A first support tube is connected to the sleeve in such a manner to allow for limited movement therebetween. A second leaf spring is received in the first support tube to secure the first support tube and the sleeve together. A second support tube is connected to the first support tube by a third leaf spring and is also removably fit over the second extension. Each knuckle device comprises a movable member movably received in a base and biased by a spring toward a locking position where rotation of the vertical tube with respect to the knuckle device is prevented. Each vertical tube has two aligned slots through which a rivet movably extends. The rivet is fixed to the movable member thereby guiding the movement of the movable member with respect to the vertical tube toward a releasing position against the biasing force of the spring to release the vertical tube from the knuckle device and thus allowing for rotation of the vertical tube with respect to the knuckle device.

The present invention will become more obvious from the following description when taken in connection with the accompanying drawings, which show, for purposes of illustration only, a preferred embodiment in accordance with the present invention.

DETAILED DESCRIPTION OF THE PREFERRED EMBODIMENTS

Figure 1:
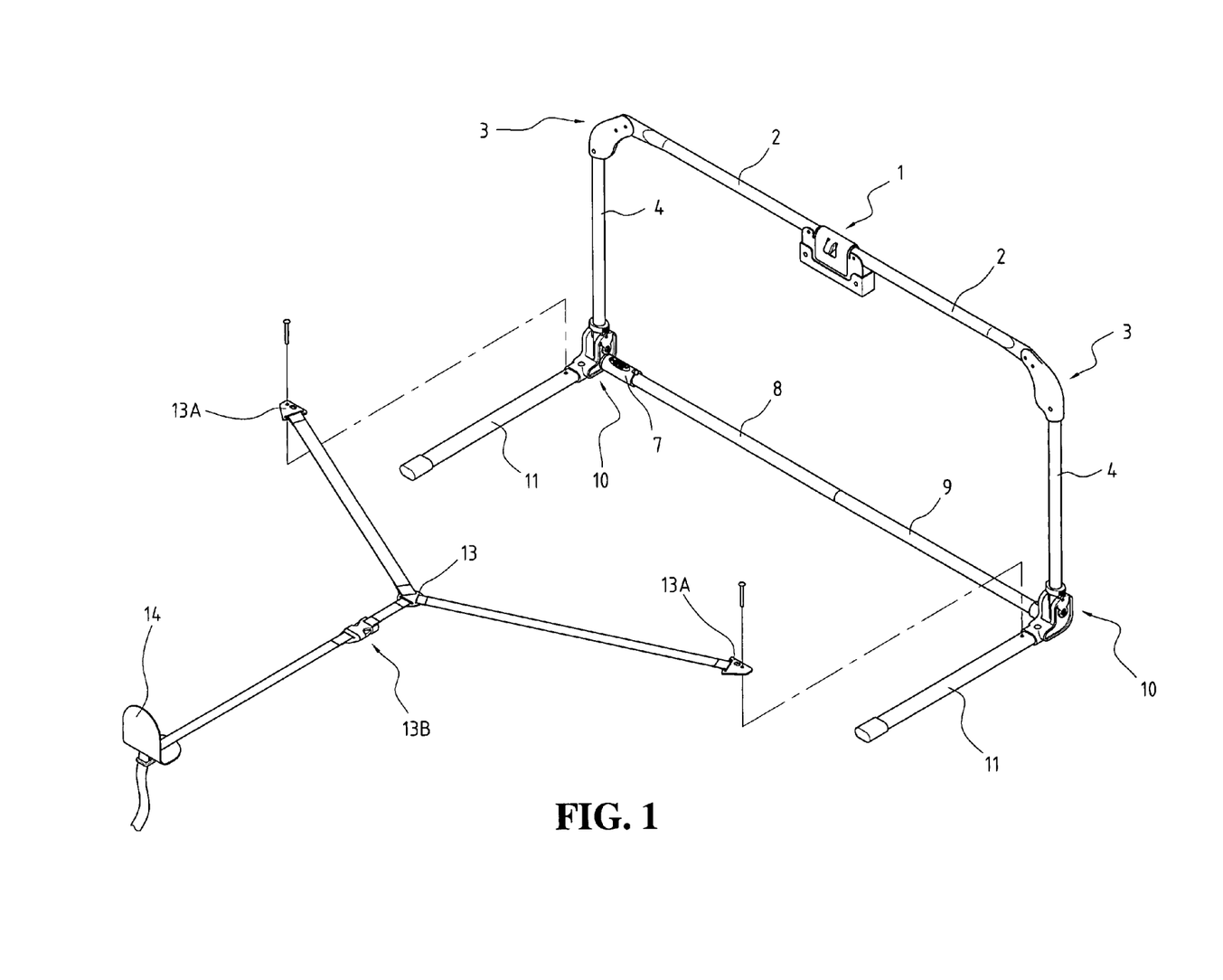
FIG. 1 is a perspective view of a bed rail assembly in accordance with the present invention with a V-shaped belt detached therefrom and a cover removed.
Figure 3:
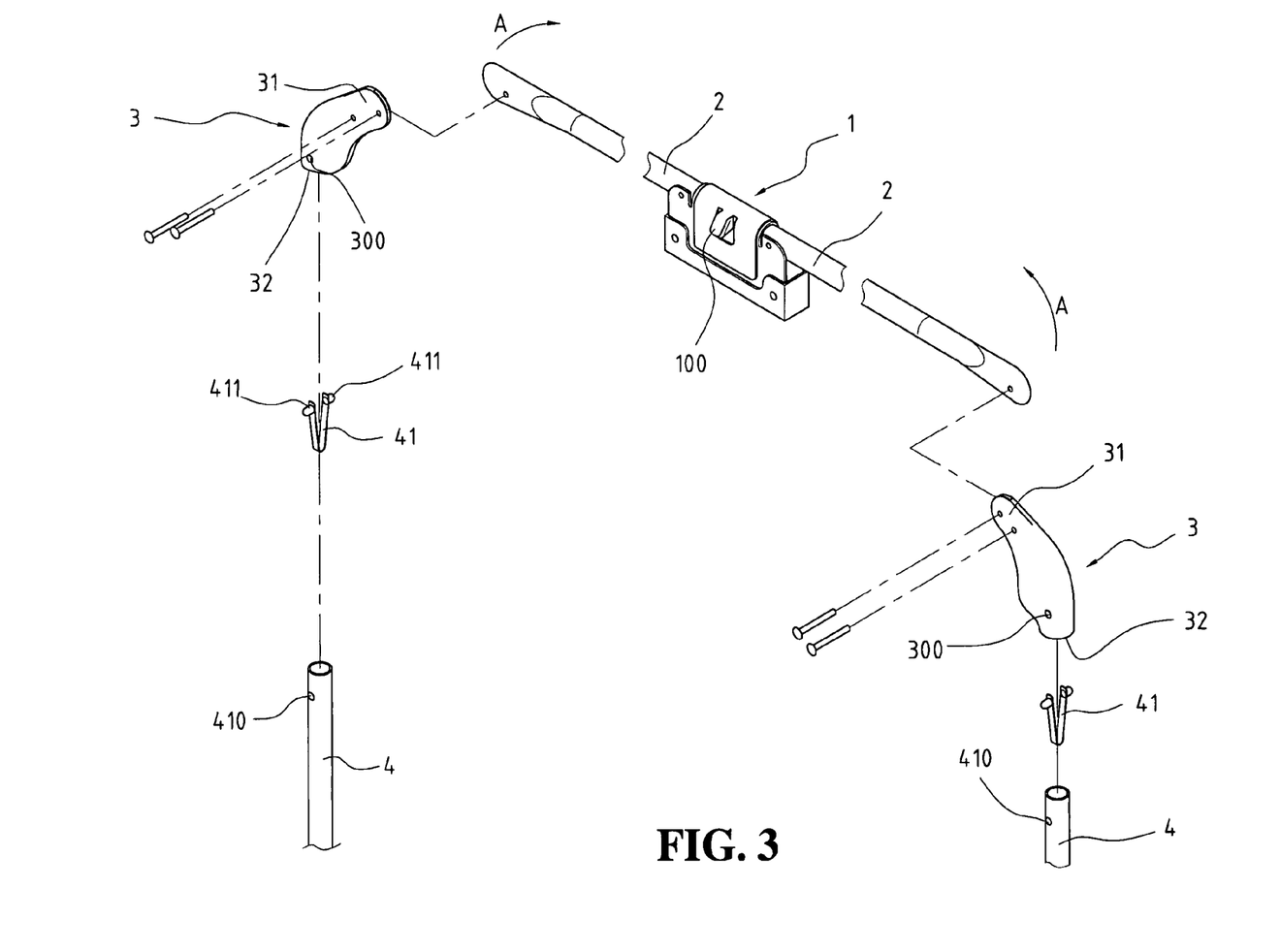
FIG. 3 is an exploded view showing the spatial relationship among top tubes, corner members, vertical tubes, and V-shaped connection plates of the bed rail assembly of the present invention.
Figure 8:
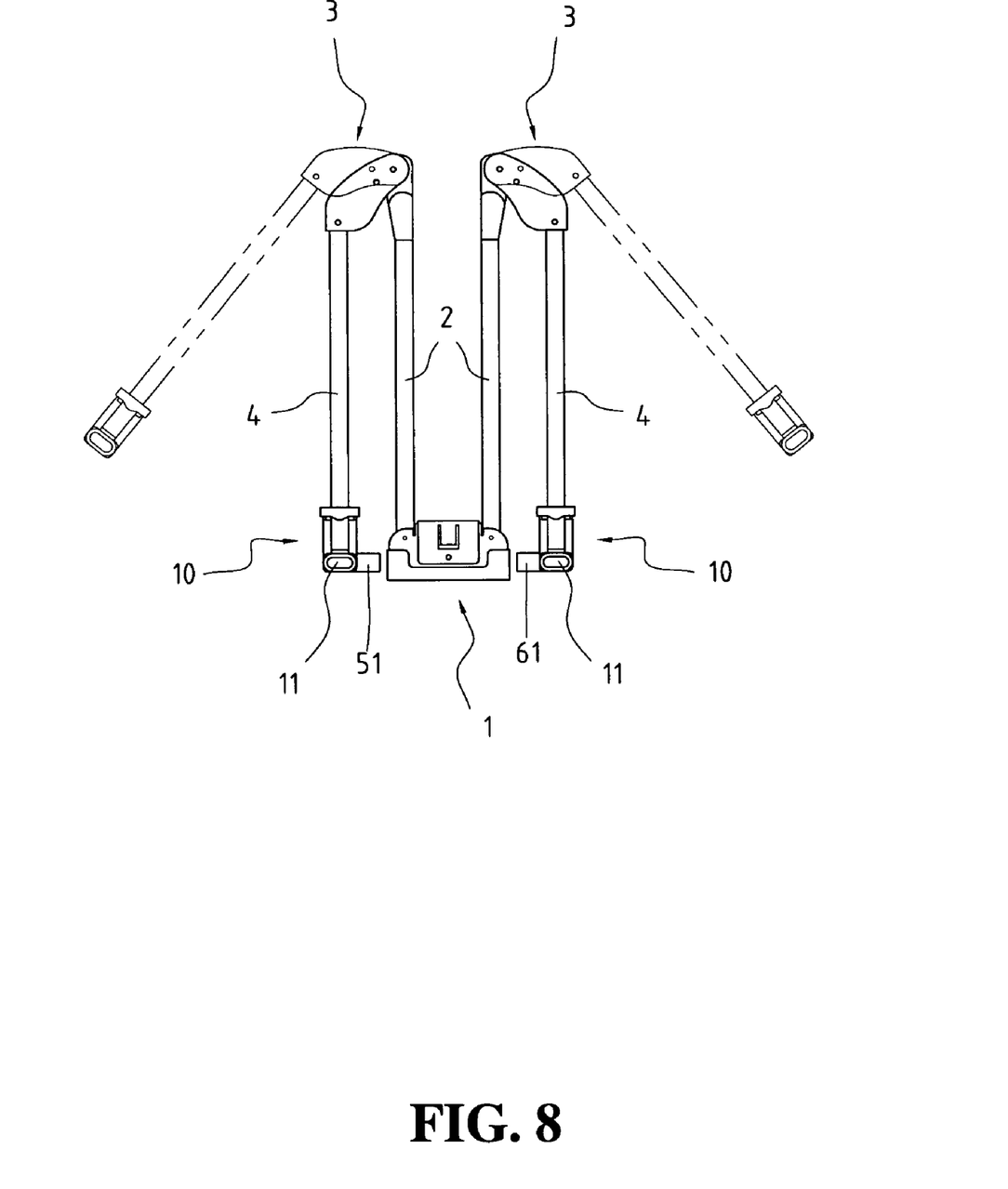
FIG. 8 is a side elevational view showing the bed rail assembly in a folded condition.

Referring to the drawings and in particular FIGS. 1 and 3, a bed rail assembly constructed in accordance with the present invention comprises a joint device 1 that is arranged between and pivoted to opposing ends of two top tubes 2. Each top tube 2 has a flat free end. The joint device 1 has a release button 100, which, when actuated, releases the top tubes 2 from the joint device 1 to allow the top tubes 2 to rotate in the direction designated by arrows A in FIG. 3 thereby folding the bed rail assembly to a compact size as shown in FIG. 8. The joint device 1 can be any known device that allows for folding and no further detail will be given hereinafter.

A substantially L-shaped corner member 3 is connected to the free end of each top tube 2. The corner member 3 has a clamp end 31 extending in a horizontal direction and pivoted to the free end of the top tube 2 and a receiving end 32 extending in a vertical direction to receive an end of a vertical tube 4 therein. A first connection plate 41, preferably a V-shaped leaf spring having two resilient arms each forming a protrusion 411, is received in the vertical tube 4 with the protrusions 411 extending through both holes 410 defined in a side wall of the vertical tube 4 and corresponding holes 300 defined in side walls of the corner member 3 thereby releasably securing the vertical tube 4 to the corner member 3 and thus the top tube 2.

Figure 2:
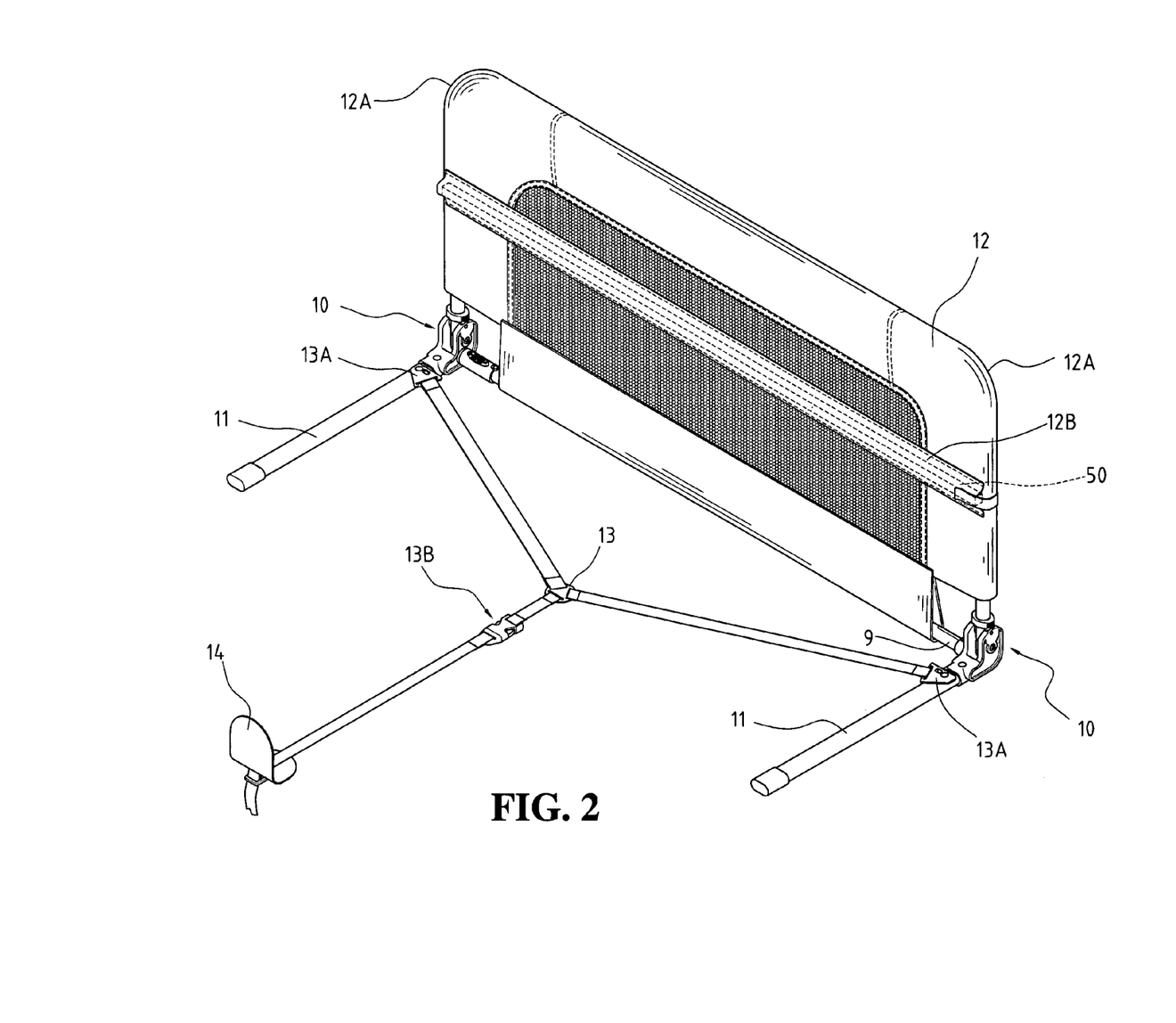
FIG. 2 is a perspective view of the bed rail assembly of the present invention with the cover attached thereto.

Also referring to FIG. 2, the top tubes 2, the corner members 3, and the vertical tubes 4 form a planar frame to which a cover 12 is attached to shield the moving parts of the bed rail assembly, including the joint device 1 between the top tubes 2 and the vertical tubes 4 therein so as to prevent undesired contact of a user with these moving parts, which causes damage to the user by the movement of the moving part. The cover 12 includes two corners 12A that fit over the corner members 3.

Figure 4:
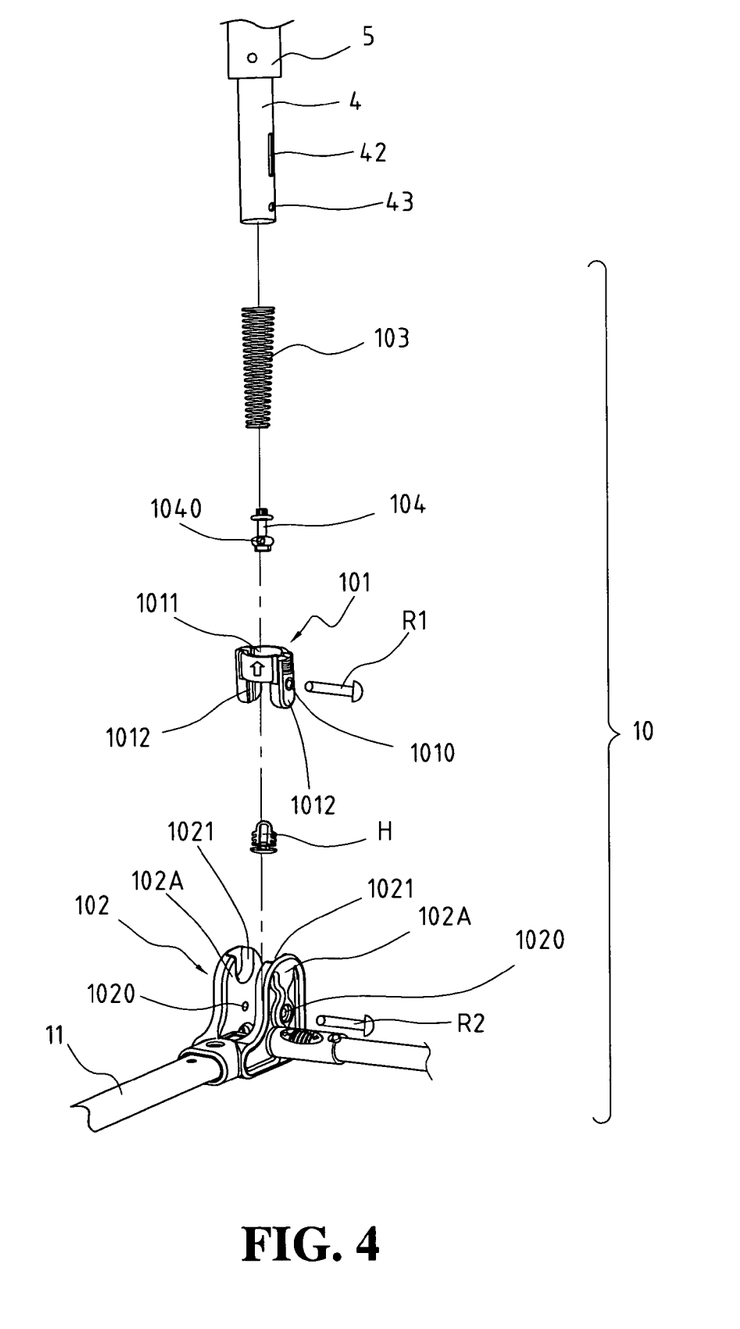
FIG. 4 is an exploded view showing a knuckle device of the bed rail assembly of the present invention.
Figure 5:
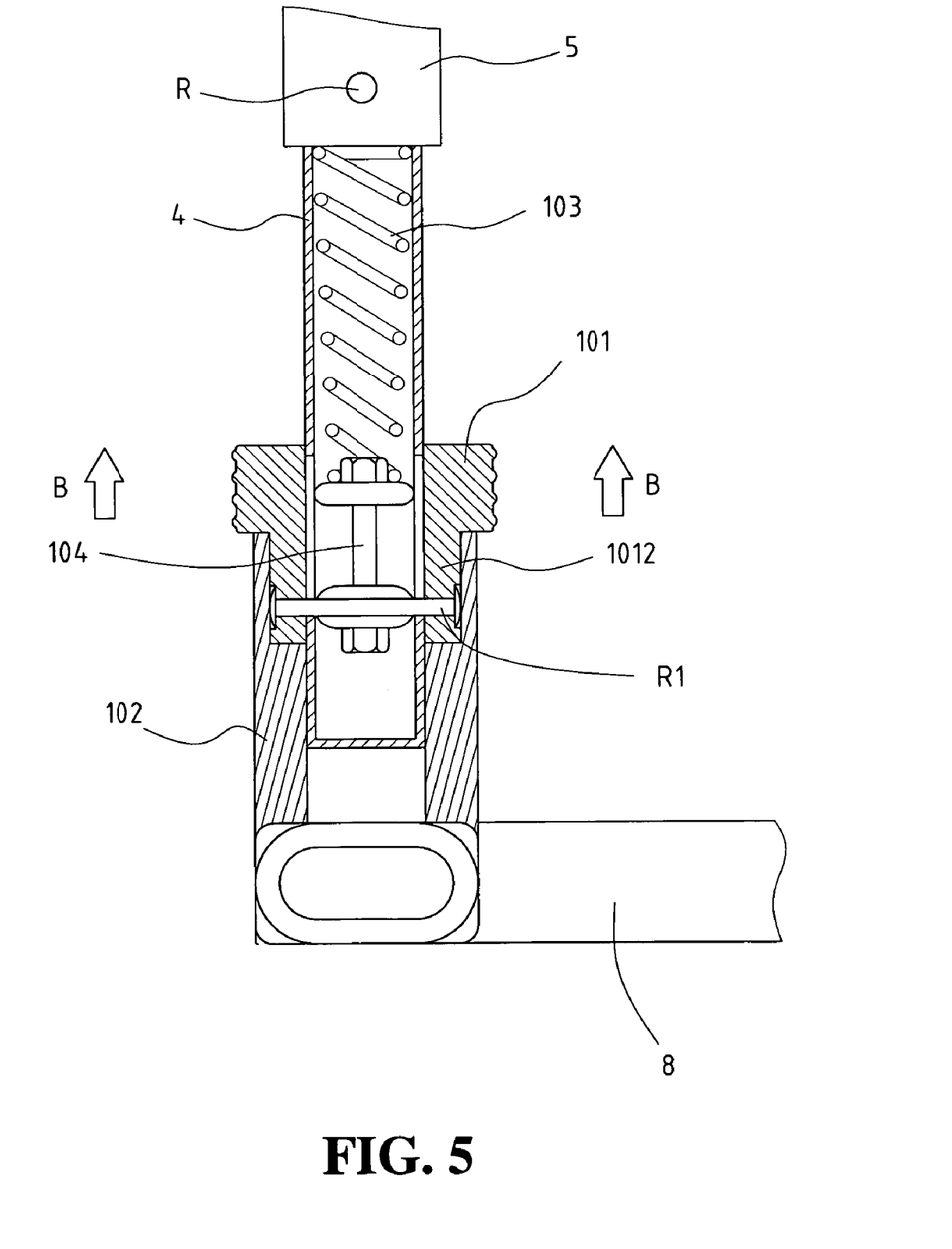
FIG. 5 is a cross-sectional view of the knuckle device to which a movable member and the vertical tube are coupled.

Also referring to FIGS. 4 and 5, a knuckle device 10 is mounted to a lower end of each vertical tube 4, comprising a base 102 having a vertical section to which the lower end of the vertical tube 4 is pivoted by a rivet or a pin R2 and a horizontal section to which an end of a horizontal support tube 11 is mounted. The horizontal support tube 11 extends in a direction substantially normal to the planar frame comprised of the top tubes 2 and the vertical tubes 4.

The base 102 of the knuckle device 10 comprises two spaced walls or plates 102A defining a space therebetween to receive a movable member 101. Each plate 102A forms in an inside surface thereof a recess 1021 defined by opposite banks (not labeled). The movable member 101 has a hollow cylindrical body 1011 movably fit over the vertical tube 4 and two insertions 1012 extending from a lower end of the cylindrical body 1011 and movably received in the recesses 1021 of the plates 102A of the base 102. The engagement of the insertions 1012 with the banks of the recess 1021 prevents the movable member 101 and thus the vertical tube 4 from rotation about the rivet or pin R2, which extends through holes 1020 defined in the plates 102A of the base 102 and aligned holes 43 defined in the lower end of the vertical tube 4.

Also movably received in the lower end of the vertical tube 4 is a stopper 104 against which a spring 103 acts. The stopper 104 and the movable member 101 are respectively located inside and outside the vertical tube 4 and are coupled to each other by a rivet R1 that extends trough a hole 1040 defined in the stopper 104 and a hole 1010 in the movable member 101 whereby the stopper 104 and the movable member 101 move in unison with each other. The vertical tube 4 defines axially elongated, aligned slots 42 slidably receiving the rivet R1 such that the movable member 101 and the stopper 104 are movable relative to the aligned slots 42.

The spring 103 is received in the vertical tube 4 and acts between the vertical tube 4 and the stopper 104 to bias the movable member 101 in such a direction as to have the insertions 1012 fit into the recesses 1021 of the plates 102A of the base 102 thereby securing the vertical tube 4 in a vertical, locking position. By manually moving the movable member 101 along the vertical tube 4 against the biasing spring 103 away from the locking position toward a released position, as indicated by arrows B of FIG. 6, the insertions 1012 disengage from the recesses 1021 of the base 102 thereby allowing the vertical tube 4 to rotate about the rivet or pin R2 with respect to the knuckle device 10.

An end cap H closes the lower end opening of the vertical tube 4.

Figure 6:
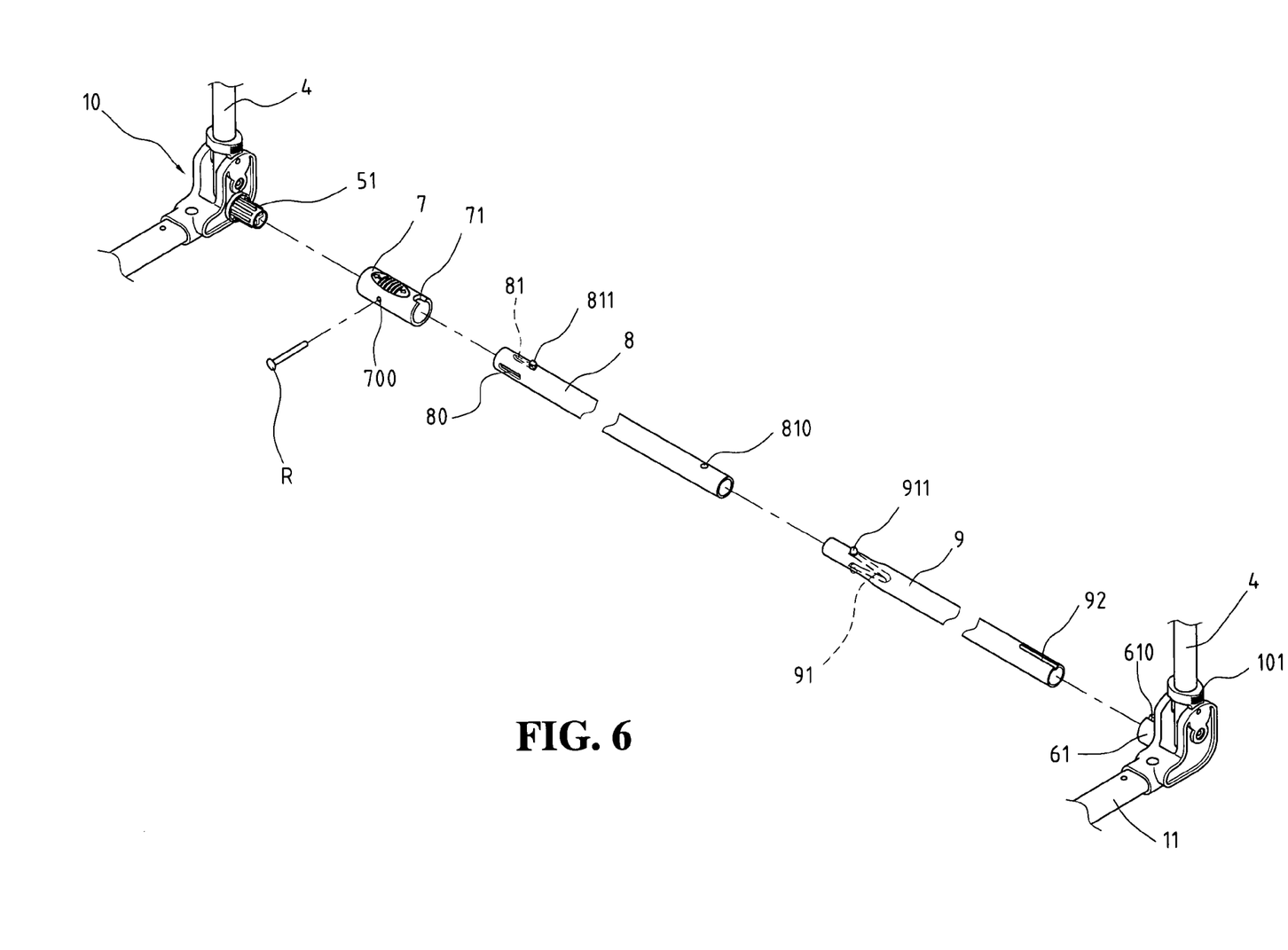
FIG. 6 is an exploded view showing the spatial relationship among the knuckle devices and support tubes of the bed rail assembly of the present invention.

Also referring to FIG. 6, first and second extensions 51, 61 respectively project from the two knuckle devices 10 toward each other to respectively couple first and second support tubes 8, 9 to the knuckle devices 10. A sleeve 7 has opposite openings (not labeled) of which a first one is slidably and removably fit over the first extension 51. A second opening of the sleeve 7 is slidably fit over an end of the first support tube 8.

The first support tube 8 defines an axially elongated slot 80 for the extension of a rivet R that extends through a corresponding hole 700 defined in the sleeve 7 thereby preventing the sleeve 7 from sliding off the first support tube 8 and limiting an axial movement of the sleeve 7 with respect to the first support tube 8. A second V-shaped connection plate or biasing element 81, such as a leaf spring, is received in the first support tube 8 and comprises a locking protrusion 811 extending from a resilient arm (not labeled) of the leaf spring through a hole (not labeled) defined in the first support tube 8 to selectively engage a notch 71 defined in an end of the sleeve 7 thereby defining an extending position of the sleeve 7.

The second support tube 9 has an end fit into a free end of the first support tube 8 and is coupled together by a third V-shaped connection plate 91, such as a leaf spring, which is received in the second support tube 9 and has two resilient arms (not labeled) each forming a protrusion 911 extending through holes (not labeled) defined in the second support tube 9 and holes 810 defined in the first support tube 8.

The second extension 61 is a hollow tube forming a rib 610, such as an elongated indentation extending axially, therein. An end of the second support tube 9 forms an axially extending slot 92 slidably receiving the rib 610 to guide the engagement between the end of the second support tube 9 and the second extension 61 and also preventing rotation of the second support tube 9 with respect to the second extension 61.

Also referring to FIG. 2, the cover 12 has a lower edge coupled to and supported by the first and second support tubes 8, 9. An elongated channel 12B is formed on the inner side of the cover 12 that faces a user and extends between the vertical tubes 4 to receive a retention bar 50 therein. The retention bar 50 is located on the inner side of the cover 12 and opposite ends of the retention bar 50 engage the vertical tubes 4 so as to support an external force acting upon the cover 50 by the user and thus protecting the user from falling off a bed. In this respect, the cover 12 may be comprised to an upper section and a lower section both jointed to the channel. Or alternatively, the channel is additionally formed on an inner surface of the cover 12.

Figure 7:
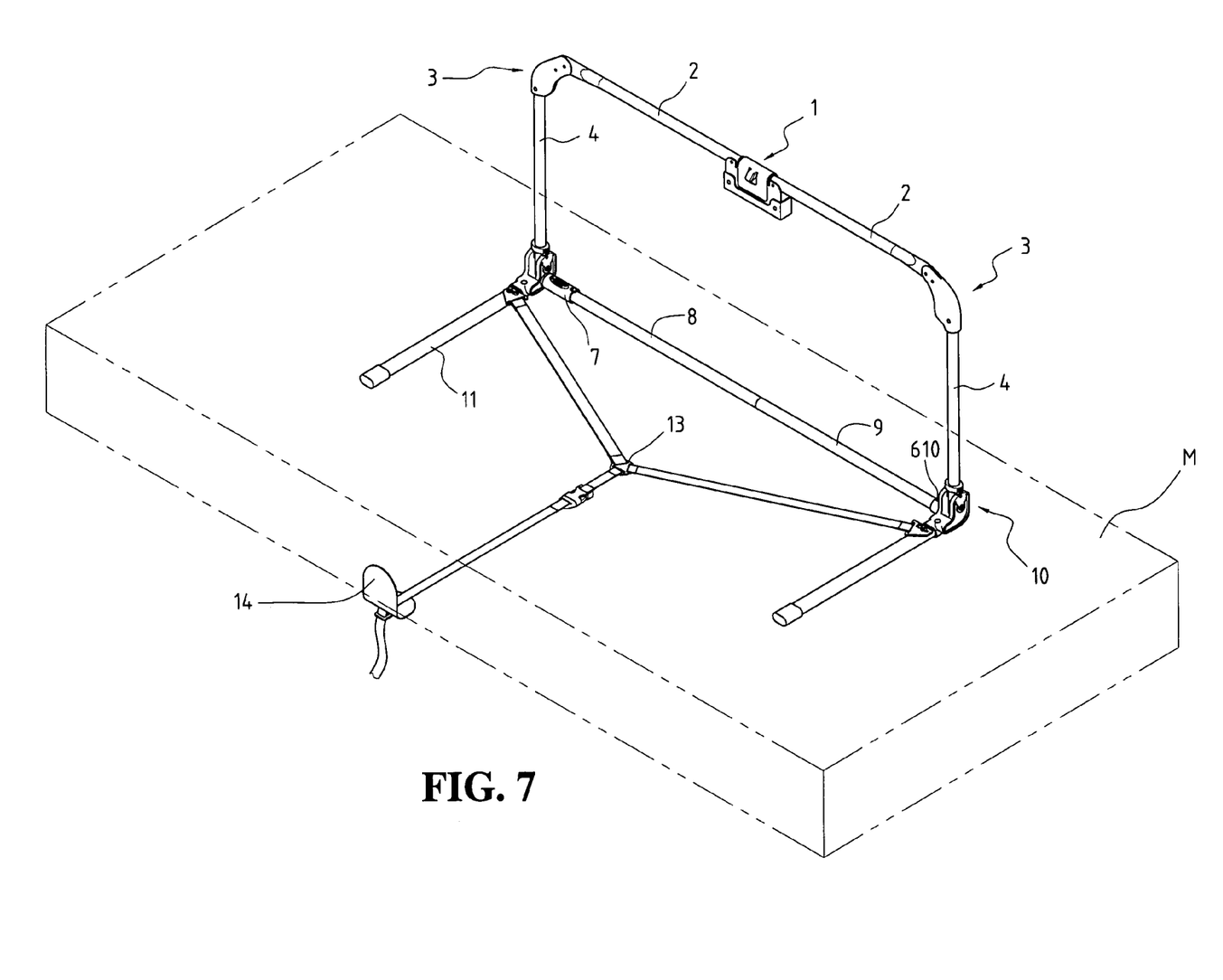
FIG. 7 is a perspective view showing an application of the bed rail assembly used in connection with a mattress of a bed.

Also referring to FIG. 7, a Y-shaped belt 13 comprises two first branches each having a distal end 13A and a second branch having a distal end 13B. The first distal ends 13A are fixed to the horizontal support tubes 11. An L-shaped retention member 14 is attached to the second distal end 13B of the belt 13 for engaging a side face of a mattress M. Each horizontal support tube 11 has a flat oval profile such that the support area for the mattress M is large enough to bear the load.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A bed rail assembly comprising:
   a joint device arranged between and pivoted to two top tubes, each top tube having a free end;
   a corner member having a clamp end pivoted to the free end of each top tube and a receiving end to which a vertical tube is connected by a first V-shaped connection plate;
   a knuckle device comprising a vertical section pivoted to a lower end of each vertical tube and a horizontal section to which a horizontal support tube is connected, each knuckle device comprising a movable member movably coupled to the vertical tube and movable between locking and releasing positions, a spring received in the vertical tube to bias the movable member toward the locking position where the vertical tube is prevented from rotation with respect to the knuckle device, the coupling between the movable member and the vertical tube comprising aligned elongate slots defined in the vertical tube and a pin movably extending through the slots and fixed to the movable member such that the movable member is movable along the aligned slots; and
   first and second extensions respectively projecting from the knuckle devices toward each other, a sleeve slidably and removably fit over the first extension and coupled to an end of a first support tube by a second V-shaped connection plate received in the first support tube in such a manner to allow a limited movement of the sleeve with respect to the first support tube, a second support tube connected to the first support tube by a third V-shaped connection plate, an end of the second support tube being slidably and removably fit over the second extension.

2. The bed rail assembly as claimed in claim 1, wherein the movable member comprises a hollow cylindrical body movably fit over the vertical tube and two insertions extending from the cylindrical body, the base comprising two spaced plates movably receiving the movable member therebetween, each plate forming a recess defined by at least one bank to receive each insertion of the movable member, the insertion being engageable with the bank to prevent the rotation of the vertical tube when the movable member is at the locking position.

3. The bed rail assembly as claimed in claim 1, wherein the horizontal support tube has a flat oval profile adapted to support a bed mattress thereon.

4. The bed rail assembly as claimed in claim 1, wherein the first V-shaped connection plate, the second V-shaped connection plate, and the third V-shaped connection plate have protrusions on two ends thereof.

5. The bed rail assembly as claimed in claim 1, wherein a horizontal portion of the second extension forms a rib in an inside surface thereof and the second support tube forms a slot slidably receiving the rib therein.

6. The bed rail assembly as claimed in claim 1 further comprising a cover that shields the joint device, the top tubes, and the vertical tubes.

7. The bed rail assembly as claimed in claim 1 further comprising a Y-shaped belt which has three distal ends and two of which are fixed to the horizontal support tubes and the remaining one retaining an L-shaped retention member that is adapted to engage a side face of a mattress.

8. The bed rail assembly as claimed in claim 6, wherein the cover forms a channel on an inner side thereof to receive a support bar having opposite ends engaging and thus supported by the vertical tubes.

* * * * *